United States Patent
Mott et al.

(10) Patent No.: US 8,283,023 B2
(45) Date of Patent: *Oct. 9, 2012

(54) ASYMMETRICAL FLEXIBLE EDGE SEAL FOR VACUUM INSULATING GLASS

(75) Inventors: Lawrence Mott, Calhan, CO (US); Kenneth Bettger, Pella, IA (US); Elliot Brown, Golden, CO (US)

(73) Assignee: Eversealed Windows, Inc., Evergreen, CO (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/537,816

(22) Filed: Aug. 7, 2009

(65) Prior Publication Data
US 2010/0034996 A1 Feb. 11, 2010

Related U.S. Application Data

(60) Provisional application No. 61/087,636, filed on Aug. 9, 2008.

(51) Int. Cl.
*E06B 3/66* (2006.01)
*E06B 3/667* (2006.01)
*E04C 2/54* (2006.01)
*F16J 15/16* (2006.01)

(52) U.S. Cl. .......... 428/182; 428/34; 428/184; 277/406; 277/419; 277/644; 52/204.599; 52/786.1

(58) Field of Classification Search .................. 428/34, 428/182, 184, 192; 52/204.599, 786.1; 49/484.1; 277/361, 406, 419, 644
See application file for complete search history.

(56) References Cited

U.S. PATENT DOCUMENTS

| | | | |
|---|---|---|---|
| 49,167 | A | 8/1865 | Stetson |
| 988,308 | A | 4/1911 | Campbell |
| 1,004,257 | A | 9/1911 | Higbee |
| 1,127,381 | A | 2/1915 | Byrnes |
| 1,388,126 | A | 8/1921 | Rohland |

(Continued)

FOREIGN PATENT DOCUMENTS
EP 0240584 A 10/1987
(Continued)

OTHER PUBLICATIONS

Arata et al. Pressure and Field Assisted Bonding of Glass to Aluminum; Transactions of JWRI is published by Welding Research Institute of Osaka University; vol. 13; No. 1; 1984; pp. 35-40.

(Continued)

*Primary Examiner* — Donald J Loney
(74) *Attorney, Agent, or Firm* — Howison & Arnott, L.L.P.

(57) ABSTRACT

A flexible edge seal for a vacuum insulating glazing unit. The flexible edge seal comprises an elongate first edge seal portion having a substantially constant first cross-section and including a bonding flange at one end, a weld surface at the other end and a first center portion therebetween. An elongate second edge seal portion has a substantially constant second cross-section and includes a bonding flange at one end, a weld surface at the other end and a second center portion therebetween. Each bonding flange includes a substantially flat portion adapted for hermetic bonding to a surface of a different one of a pair of glass panes. The weld surfaces are hermetically joined to one another forming a hermetic seal therebetween. At least one of the first center portion and the second center portion has a convolute cross-section and is asymmetrical to the other center portion.

17 Claims, 3 Drawing Sheets

U.S. PATENT DOCUMENTS

| | | |
|---|---|---|
| 1,436,197 A | 11/1922 | Rohland |
| 1,560,690 A | 11/1925 | Housekeeper |
| 2,011,557 A | 8/1935 | Anderegg |
| 2,057,969 A | 8/1935 | Payson et al. |
| 2,119,009 A | 5/1938 | Elias |
| 2,177,001 A | 10/1939 | Owen |
| 2,206,558 A | 7/1940 | Bennet |
| 2,220,690 A | 11/1940 | Stupakoff |
| 2,625,717 A | 1/1953 | Wampler et al. |
| 2,708,774 A | 5/1955 | Seelen |
| 2,730,987 A | 1/1956 | Nelson |
| 2,756,467 A | 7/1956 | Etling |
| 3,232,732 A | 2/1966 | Wax |
| 3,389,522 A | 6/1968 | Hordis |
| 3,698,878 A | 10/1972 | Hale et al. |
| 3,778,127 A | 12/1973 | Langston |
| 3,778,244 A | 12/1973 | Nedelec |
| 3,808,115 A | 4/1974 | Manion |
| 3,828,960 A | 8/1974 | Walles |
| 3,865,567 A | 2/1975 | Klomp |
| 3,901,997 A | 8/1975 | Groth |
| 3,902,883 A | 9/1975 | Bayer |
| 3,922,705 A | 11/1975 | Yerman |
| 3,940,898 A | 3/1976 | Kaufman |
| 3,971,178 A | 7/1976 | Mazzoni |
| 3,979,668 A | 9/1976 | Samulowitz |
| 3,990,201 A | 11/1976 | Falbel |
| 4,016,644 A | 4/1977 | Kurtz |
| 4,035,539 A | 7/1977 | Luboshez |
| 4,047,351 A | 9/1977 | Derner |
| 4,060,660 A | 11/1977 | Carlson |
| 4,063,271 A | 12/1977 | Bean et al. |
| 4,089,143 A | 5/1978 | LaPietra |
| 4,099,082 A | 7/1978 | Chodil et al. |
| 4,132,218 A | 1/1979 | Bennett |
| 4,186,725 A | 2/1980 | Schwartz |
| 4,204,015 A | 5/1980 | Wardlaw et al. |
| 4,261,086 A | 4/1981 | Giachino et al. |
| 4,274,936 A | 6/1981 | Love |
| 4,303,732 A | 12/1981 | Torobin |
| 4,355,323 A | 10/1982 | Kock |
| 4,357,187 A | 11/1982 | Stanley |
| 4,427,123 A | 1/1984 | Komeda et al. |
| 4,444,821 A | 4/1984 | Young et al. |
| 4,468,423 A | 8/1984 | Hall |
| 4,486,482 A | 12/1984 | Kobayashi |
| 4,531,511 A | 7/1985 | Hochberg |
| 4,547,432 A | 10/1985 | Pitts |
| 4,649,085 A | 3/1987 | Landram |
| 4,683,154 A | 7/1987 | Benson |
| 4,687,687 A | 8/1987 | Terneu |
| 4,737,475 A | 4/1988 | Thomas |
| 4,780,164 A | 10/1988 | Rueckheim |
| 4,928,448 A | 5/1990 | Phillip |
| 5,005,557 A | 4/1991 | Bachli |
| 5,009,218 A | 4/1991 | Bachli |
| 5,014,466 A | 5/1991 | Winner |
| 5,017,252 A | 5/1991 | Aldrich |
| 5,032,439 A | 7/1991 | Glicksman |
| 5,085,926 A | 2/1992 | Iida |
| 5,086,729 A | 2/1992 | Katagiri |
| 5,107,649 A | 4/1992 | Benson |
| 5,115,299 A | 5/1992 | Wright |
| 5,115,612 A | 5/1992 | Newton et al. |
| 5,118,924 A | 6/1992 | Mehra et al. |
| 5,124,185 A | 6/1992 | Kerr |
| 5,157,893 A | 10/1992 | Benson et al. |
| 5,175,975 A | 1/1993 | Benson et al. |
| 5,227,206 A | 7/1993 | Bachli |
| 5,270,084 A | 12/1993 | Parker |
| 5,302,414 A | 4/1994 | Alkhimov et al. |
| 5,330,816 A | 7/1994 | Rusek |
| 5,378,527 A | 1/1995 | Nakanishi |
| 5,423,119 A | 6/1995 | Yang |
| 5,433,056 A | 7/1995 | Benson |
| 5,443,871 A * | 8/1995 | Lafond ............... 428/34 |
| 5,489,321 A | 2/1996 | Benson |
| 5,508,092 A | 4/1996 | Kimock |
| 5,525,430 A | 6/1996 | Chahroudi |
| 5,582,866 A | 12/1996 | White |
| 5,589,239 A | 12/1996 | Tomono et al. |
| 5,610,431 A | 3/1997 | Martin |
| 5,625,222 A | 4/1997 | Yoneda et al. |
| 5,643,644 A | 7/1997 | Demars |
| 5,657,607 A | 8/1997 | Collins et al. |
| 5,719,979 A | 2/1998 | Furuyama |
| 5,778,629 A | 7/1998 | Howes |
| 5,789,857 A | 8/1998 | Yamaura |
| 5,811,926 A | 9/1998 | Novich |
| 5,846,638 A | 12/1998 | Meissner |
| 5,855,638 A | 1/1999 | Demars |
| 5,856,914 A | 1/1999 | O'Boyle |
| 5,891,536 A | 4/1999 | Collins |
| 5,897,927 A | 4/1999 | Tsai |
| 5,902,652 A | 5/1999 | Collins et al. |
| 5,920,463 A | 7/1999 | Thomas et al. |
| 5,937,611 A | 8/1999 | Howes |
| 5,945,721 A | 8/1999 | Tatoh |
| 5,949,655 A | 9/1999 | Glenn |
| 5,950,398 A | 9/1999 | Hubbard |
| 5,982,010 A | 11/1999 | Namba et al. |
| 5,983,593 A | 11/1999 | Carbary et al. |
| 6,007,397 A | 12/1999 | Ju |
| 6,020,628 A | 2/2000 | Mravic et al. |
| 6,052,965 A | 4/2000 | Florentin |
| 6,054,195 A | 4/2000 | Collins |
| 6,071,575 A | 6/2000 | Collins |
| 6,083,578 A | 7/2000 | Collins |
| 6,101,783 A | 8/2000 | Howes |
| 6,114,804 A | 9/2000 | Kawase |
| 6,131,410 A | 10/2000 | Swierkowski |
| 6,139,913 A | 10/2000 | Van Steenkiste et al. |
| 6,141,925 A | 11/2000 | Halvorson, Jr. et al. |
| 6,168,040 B1 | 1/2001 | Sautner et al. |
| 6,191,359 B1 | 2/2001 | Sengupta et al. |
| 6,291,036 B1 | 9/2001 | Wang |
| 6,352,749 B1 | 3/2002 | Aggas |
| 6,365,242 B1 | 4/2002 | Veerasamy |
| 6,372,312 B1 | 4/2002 | Aggas |
| 6,383,580 B1 | 5/2002 | Aggas |
| 6,387,460 B1 | 5/2002 | Shukuri |
| 6,399,169 B1 | 6/2002 | Wang |
| 6,416,375 B1 | 7/2002 | Cho |
| 6,420,002 B1 | 7/2002 | Aggas et al. |
| 6,436,492 B1 | 8/2002 | Landa et al. |
| 6,444,281 B1 | 9/2002 | Wang |
| 6,468,610 B1 | 10/2002 | Morimoto |
| 6,478,911 B1 | 11/2002 | Wang |
| 6,479,112 B1 | 11/2002 | Shukuri |
| 6,497,931 B1 | 12/2002 | Aggas |
| 6,503,583 B2 | 1/2003 | Nalepka et al. |
| 6,506,272 B1 | 1/2003 | Aggas |
| 6,521,988 B2 | 2/2003 | Hauser et al. |
| 6,537,121 B1 | 3/2003 | Baret |
| 6,538,312 B1 | 3/2003 | Peterson et al. |
| 6,541,083 B1 | 4/2003 | Landa et al. |
| 6,541,084 B2 | 4/2003 | Wang |
| 6,548,895 B1 | 4/2003 | Benavides et al. |
| 6,558,494 B1 | 5/2003 | Wang |
| 6,571,580 B1 | 6/2003 | Lodge |
| 6,627,814 B1 | 9/2003 | Stark |
| 6,635,321 B2 | 10/2003 | Wang et al. |
| 6,637,644 B2 | 10/2003 | Bachli |
| 6,639,313 B1 | 10/2003 | Martin et al. |
| 6,641,689 B1 | 11/2003 | Aggas |
| 6,653,724 B1 | 11/2003 | Kim et al. |
| 6,656,768 B2 | 12/2003 | Thomas |
| 6,668,500 B1 | 12/2003 | Lamberts |
| 6,692,600 B2 | 2/2004 | Veerasamy |
| 6,696,849 B2 | 2/2004 | Ban et al. |
| 6,701,749 B2 | 3/2004 | Wang et al. |
| 6,723,379 B2 | 4/2004 | Stark |
| 6,736,295 B2 | 5/2004 | Lin et al. |
| 6,759,590 B2 | 7/2004 | Stark |
| 6,763,638 B1 | 7/2004 | Berger, Jr. |
| 6,789,362 B1 | 9/2004 | Hessabi |
| 6,793,990 B1 | 9/2004 | Sakaguchi |

| | | | |
|---|---|---|---|
| 6,860,075 B2 | 3/2005 | Sager-Hintermann et al. |
| 6,897,125 B2 | 5/2005 | Morrow et al. |
| 6,924,974 B2 | 8/2005 | Stark |
| 6,928,776 B2 | 8/2005 | Hornung |
| 6,946,171 B1 | 9/2005 | Aggas |
| 6,962,834 B2 | 11/2005 | Stark |
| 6,966,208 B1 | 11/2005 | Collins |
| 6,974,518 B2 | 12/2005 | Hornung |
| 7,045,181 B2 | 5/2006 | Yoshizawa |
| 7,081,178 B2 | 7/2006 | Collins |
| 7,100,343 B2 | 9/2006 | France |
| 7,114,306 B2 | 10/2006 | Minaai |
| 7,141,130 B2 | 11/2006 | Minaai |
| 7,238,546 B2 | 7/2007 | Stark |
| 7,517,712 B2 | 4/2009 | Stark |
| 2001/0020738 A1 | 9/2001 | Iizima et al. |
| 2002/0041424 A1 | 4/2002 | Lynam |
| 2002/0043046 A1 | 4/2002 | Cooper et al. |
| 2002/0113296 A1 | 8/2002 | Cho et al. |
| 2003/0188881 A1 | 10/2003 | Stark |
| 2004/0020676 A1 | 2/2004 | Stark |
| 2004/0104460 A1 | 6/2004 | Stark |
| 2004/0161530 A1 | 8/2004 | Stark |
| 2004/0187437 A1 | 9/2004 | Stark |
| 2004/0188124 A1 | 9/2004 | Stark |
| 2005/0067179 A1 | 3/2005 | Stark |
| 2005/0138892 A1 | 6/2005 | Misonou |
| 2005/0217319 A1 | 10/2005 | Yoshizawa |
| 2005/0257877 A1 | 11/2005 | Stark |
| 2005/0275079 A1 | 12/2005 | Stark |
| 2006/0157274 A1 | 7/2006 | Stark |
| 2006/0187608 A1 | 8/2006 | Stark |
| 2006/0191215 A1 | 8/2006 | Stark |
| 2006/0207218 A1 | 9/2006 | Minaai et al. |
| 2009/0032924 A1 | 2/2009 | Stark |
| 2009/0074997 A1 | 3/2009 | Stark |
| 2010/0034996 A1 | 2/2010 | Mott |
| 2010/0119740 A1 | 5/2010 | Bettger |
| 2010/0175347 A1 | 7/2010 | Bettger |
| 2010/0178439 A1 | 7/2010 | Bettger |

FOREIGN PATENT DOCUMENTS

WO      2006121954 A      11/2006

OTHER PUBLICATIONS

Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.

Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.

Doron Teomim, Avner Badihi, Gil Zilber; "An innovative approach to wafer-level MEMS packaging"; Solid State Technology (Magazine); Jan. 2002; Penwell (Publ.); Nashua, NH USA.

Dunkerton; TWI Knowledge Summary Diffusion Bonding; Copyright 2001; TWI World Centre for Materials Joinging Technology Website; www.twi.co.uk; United Kingdom; 4 pages.

George S. Brady, et al., Materials Handbook, 12th Edition; 1986; pp. 28-29; McGraw-Hill Book Company; New York.

JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, California Institute of Technology, Pasadena, CA, USA (Best Available Copy).

Kazakov et al.; Equipment for Diffusion Welding of Rectangular Glass Plates to Kovar; Svarochnoe Proizvodstvo; Jun. 1977; p. 50; (in Russian, English translation provided).

Kazakov, N. F. (ed.); Diffusion Bonding of Materials; 1981; pp. 4-9, 248-257; Pergamon Press; U.S.A.

Nicholas, M.G. & Lee, R. J.; Joining Dissimilar Materials, Metals and Materials, The Journal of the Institute of Metals, vol. 5, No. 6, Jun. 1989; UK.

NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasadena, CA, USA (Best Available Copy).

Ostyn, K. & Vinckier, A.; Joining of Different Materials Through Interfaces; Interfaces in Materials, Proceedings of the Colloquium; pp. 153-173; Brussels, Dec. 1988.

PCT: International Search Report of PCT/US03/07553 (related application); International Publication No. WO 03/083938 A1; Jun. 16, 2003; 2 pgs.

PCT: International Search Report of PCT/US04/02272 (related application); International Publication No. WO 2004/068189; Jan. 27, 2004; 1 pg.

R.C. Dykhuizen et al.; Gas Dynamic Principles of Cold Spray; Journal of Thermal Spray Technology; vol. 7(2); pp. 205-212; Jun. 1998.

Sadovsky et al.; Precision Welding of Glass to Kovar Without Melting; Svarochnoe Proizvodstvo; Feb. 1973; pp. 22; (in Russian, English translation provided).

PCT: Written Opinion of the International Searching Authority of PCT/USO4/02272 (related application); International Publication No. WO 2004/068189; Mar. 16, 2005; 3 pgs.

PCT: International Search Report of PCT/US05/13237 (related application); International Publication No. WO 2005/118291 A3; Oct. 24, 2006; 1 pg.

PCT: Written Opinion of the International Searching Authority of PCT/US05/13237 (related application); International Publication No. WO 2005/118291; Oct. 24, 2006; 5 pgs.

PCT: International Search Report of PCT/US06/17595 (related application); International Publication No. WO 2006/121954; Aug. 20, 2008; 3 pgs.

PCT: Written Opinion of the International Searching Authority of PCT/US06/17595 (related application); International Publication No. WO 2006/121954; Aug. 20, 2008; 10 pgs.

PCT: International Search Report of PCT/US08/76278 (related application); Jan. 16, 2009; 4 pgs.

PCT: Written Opinion of the International Searching Authority of PCT/US08/76278 (related application); Jan. 16, 2009; 5 pgs.

PCT: International Preliminary Report on Patentability of PCT/US2008/076278 (related application); Mar. 25, 2010.

"Diffusion Bonding—Ceramics and ceramic/meal joints", TWI Knowledge Summary, 2000. http://www.twi.co.uk/content/ksjaf005.html.

PCT: International Search Report and Written Opinion of PCT/US2009/053206 (related application); Feb. 17, 2010; 8 pgs.

PCT: International Preliminary Report on Patentability of PCT/US2009/053206 (counterpart application); Feb. 24, 2011; 7 pgs.

* cited by examiner

ASYMMETRICAL FLEXIBLE EDGE SEAL FOR VACUUM INSULATING GLASS

CROSS-REFERENCE TO RELATED APPLICATIONS

This application is a non-provisional of and claims benefit to U.S. Provisional Application for Patent Ser. No. 61/087,636, filed Aug. 9, 2008, and entitled ASYMMETRICAL FLEXIBLE EDGE SEAL FOR VACUUM INSULATING GLASS, the specification of which is incorporated herein by reference in its entirety.

TECHNICAL FIELD

The following disclosure relates generally to insulating glazing devices (including both insulated glazing units and vacuum insulating glazing units) and, in particular, to flexible edge seals providing an airtight seal between the spaced-apart panes of an insulating glazing device.

BACKGROUND

It is well known to construct energy-efficient windows using insulating glazing devices in order to reduce the flow of heat through the windows. Insulating glazing devices typically comprise two or more parallel glass sheets (also called "panes" or "lights") separated by a narrow gap (i.e., space) and sealed around their periphery. When the inter-pane space is filled with air or another gas at near-atmospheric pressure, the device is commonly called an insulating glazing unit, insulated glass unit or IGU. When the inter-pane space is evacuated (or partly evacuated), the device is commonly called a vacuum insulating glazing unit, vacuum insulated glass unit or VIGU.

Examples of insulated glazing devices are disclosed in U.S. Patent Application Publication No. 2006/0187608 A1, titled Insulated Glazing Units, published Aug. 24, 2006, and U.S. Patent Application Publication No. 2006/0191215, titled Insulated Glazing Units and Methods, published Aug. 31, 2006, by inventor David H. Stark, both applications being hereby incorporated herein by reference. These applications describe the need for VIGUs to have an arrangement at the edges of the glass to form a seal between the two panes of glass, and disclose various embodiments to address this need.

It is generally understood by those who are skilled in the art, that an in-situ VIGU will be subjected to a variety of mechanical, thermal and chemical stresses, all acting simultaneously with varying levels of intensity, throughout the operating lifetime of the VIGU. The nature and magnitude of these stresses are also understood.

It is also generally understood by those skilled in the art that since the VIGU assembly incorporates several discrete elements, which each embody characteristic geometry and thermal expansion properties, and all of these elements are subsequently joined together by some means, the resulting mechanical system will react to stresses in a complex manner. For instance, a single pane of glass subjected to cold exterior and warm interior temperatures would be expected to exhibit a fairly simple pattern of internal stresses as a result of this condition. However, a VIGU, subjected to the same cold and warm temperature conditions would exhibit a much more complex stress pattern, especially at the edges where the inner and outer panes are joined together by some means.

It can readily be observed that insulating glass units (IGU) all embody a flexible sealant at the outer edge of the glass, which readily deflects slightly to relieve the stresses that occur during exposure to the aforementioned stresses. IGUs are generally described as inner and outer glass pane assemblies with gas in the gap between the panes and are in common use in the marketplace.

It can also be readily observed that VIGUs with edge seals formed by rigid materials exhibit significant deflections when subjected to cold external and warm internal temperature conditions. The observed deflections are caused by transient stresses, which are locked in place by the rigid edge seals. Further observations can be made that these deflections in some cases, cause the window assembly to deflect, bind up and become non-functional—a serious issue in the case of situations requiring egress through the window. Long term issues involving edge seal failures due to the high stresses are anticipated, but are not characterized at the present time.

A need therefore exists, for a flexible edge seal (FES) element that seals the space between the glass sheets of an IGU or VIGU while accommodating the transient stresses and mitigating the effects of temperature differentials between cold and warm environments.

SUMMARY

In one aspect thereof, a vacuum insulating glazing unit (VIGU) comprises a pair of glass panes separated by an insulating gap. A flexible edge seal (FES) is hermetically attached between the panes around their entire periphery, thereby defining an interior space in communication with the gap. The gap and the space are at least partially evacuated to provide a thermal barrier between the panes. The FES has an asymmetric convolute form when viewed in cross-section along a plane parallel to the gap.

In another aspect thereof, a flexible edge seal is provided for a vacuum insulating glazing unit including a pair of glass panes separated by an insulating gap. The flexible edge seal comprises an elongate first edge seal portion defining a first longitudinal axis, the first edge seal portion having a substantially constant first cross-section when viewed along the first longitudinal axis, the first cross-section including a bonding flange at one end, a weld surface at the other end and a first center portion therebetween. An elongate second edge seal portion defines a second longitudinal axis substantially parallel to the first longitudinal axis, the second edge seal portion having a substantially constant second cross-section when viewed along the second longitudinal axis, the second cross-section including a bonding flange at one end, a weld surface at the other end and a second center portion therebetween. Each bonding flange includes a substantially flat portion adapted for hermetic bonding to a surface of a different one of the pair of glass panes. The weld surfaces are hermetically joined to one another forming a hermetic seal therebetween. At least one of the first center portion and the second center portion has a convolute cross-section and is asymmetrical, with respect to a plane defined by the center of the insulating gap, to the other center portion.

Other aspects include:

A flexible edge seal, wherein at least one of the first center portion and the second center portion includes multiple convolutes.

A flexible edge seal, wherein both the first center portion and the second center portion include at least one convolute.

A flexible edge seal, wherein the first center portion includes a different number of convolutes than the second center portion.

A flexible edge seal, wherein both the first center portion and the second center portion include multiple convolutes.

A flexible edge seal, wherein the number of convolutes on each of the first and second center portions is within the range from two convolutes to six convolutes.

A flexible edge seal, wherein the first center portion includes a different number of convolutes than the second center portion.

A flexible edge seal, wherein at least one of the convolutes on one of the first and second center portions crosses the plane defined by the center of the insulating gap and at least partially nests within a convolute on the other of the center portions.

A flexible edge seal, wherein the upper and lower surfaces of at least one of the bonding flanges define a taper angle with respect to one another such that the bonding flange tapers in thickness in the region adapted for bonding to the pane.

A flexible edge seal, wherein the taper angle is within the range from about 2 degrees to about 10 degrees.

In another aspect thereof, a vacuum insulating glazing unit comprises a pair of glass panes separated by an insulating gap and a flexible edge seal. The flexible edge seal including an elongate first edge seal portion defining a first longitudinal axis, the first edge seal portion having a substantially constant first cross-section when viewed along the first longitudinal axis, the first cross-section including a bonding flange at one end, a weld surface at the other end and a first center portion therebetween. An elongate second edge seal portion defines a second longitudinal axis substantially parallel to the first longitudinal axis, the second edge seal portion having a substantially constant second cross-section when viewed along the second longitudinal axis, the second cross-section including a bonding flange at one end, a weld surface at the other end and a second center portion therebetween. Each bonding flange includes a substantially flat portion hermetically bonded to a surface of a different one of the pair of glass panes. The weld surfaces are hermetically joined to one another forming a hermetic seal therebetween. At least one of the first center portion and the second center portion have a convolute cross-section and are asymmetrical, with respect to a plane defined by the center of the insulating gap, to the other center portion.

Other aspects include:

A vacuum insulating glazing unit, wherein at least one of the first center portion and the second center portion includes multiple convolutes.

A vacuum insulating glazing unit, wherein both the first center portion and the second center portion include at least one convolute.

A vacuum insulating glazing unit, wherein the first center portion includes a different number of convolutes than the second center portion.

A vacuum insulating glazing unit, wherein the number of convolutes on each of the first and second center portions is within the range from two convolutes to six convolutes.

A vacuum insulating glazing unit, wherein at least one of the convolutes on one of the first and second center portions crosses the plane defined by the center of the insulating gap and at least partially nests within a convolute on the other of the center portions.

A vacuum insulating glazing unit, wherein the upper and lower surfaces of at least one of the bonding flanges define a taper angle with respect to one another such that the bonding flange tapers in thickness in the region adapted for bonding to the pane.

In another aspect thereof, a method for forming a vacuum insulating glazing unit comprises the following steps: Providing a pair of glass panes separated by an insulating gap; providing an elongate first edge seal portion defining a first longitudinal axis, the first edge seal portion having a substantially constant first cross-section when viewed along the first longitudinal axis, the first cross-section including a bonding flange at one end, a weld surface at the other end and a first center portion therebetween; providing an elongate second edge seal portion defining a second longitudinal axis substantially parallel to the first longitudinal axis, the second edge seal portion having a substantially constant second cross-section when viewed along the second longitudinal axis, the second cross-section including a bonding flange at one end, a weld surface at the other end and a second center portion therebetween; wherein at least one of the first center portion and the second center portion has a convolute cross-section and is asymmetrical, with respect to a plane defined by the center of the insulating gap, to the other center portion; hermetically bonding the bonding flange of each of the first and second edge seal portions to a surface of a different one of the pair of glass panes; at least partially evacuating the atmosphere in the gap between the panes; and hermetically bonding the weld surfaces to one another forming a hermetic seal therebetween.

Other aspects include:

A method for forming a vacuum insulating glazing unit, wherein the step of at least partially evacuating the atmosphere is performed before the step of hermetically bonding the weld surfaces.

A method for forming a vacuum insulating glazing unit, wherein the step of at least partially evacuating the atmosphere is performed after the step of hermetically bonding the weld surfaces.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of an asymmetrical flexible edge seal for vacuum insulating glass are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
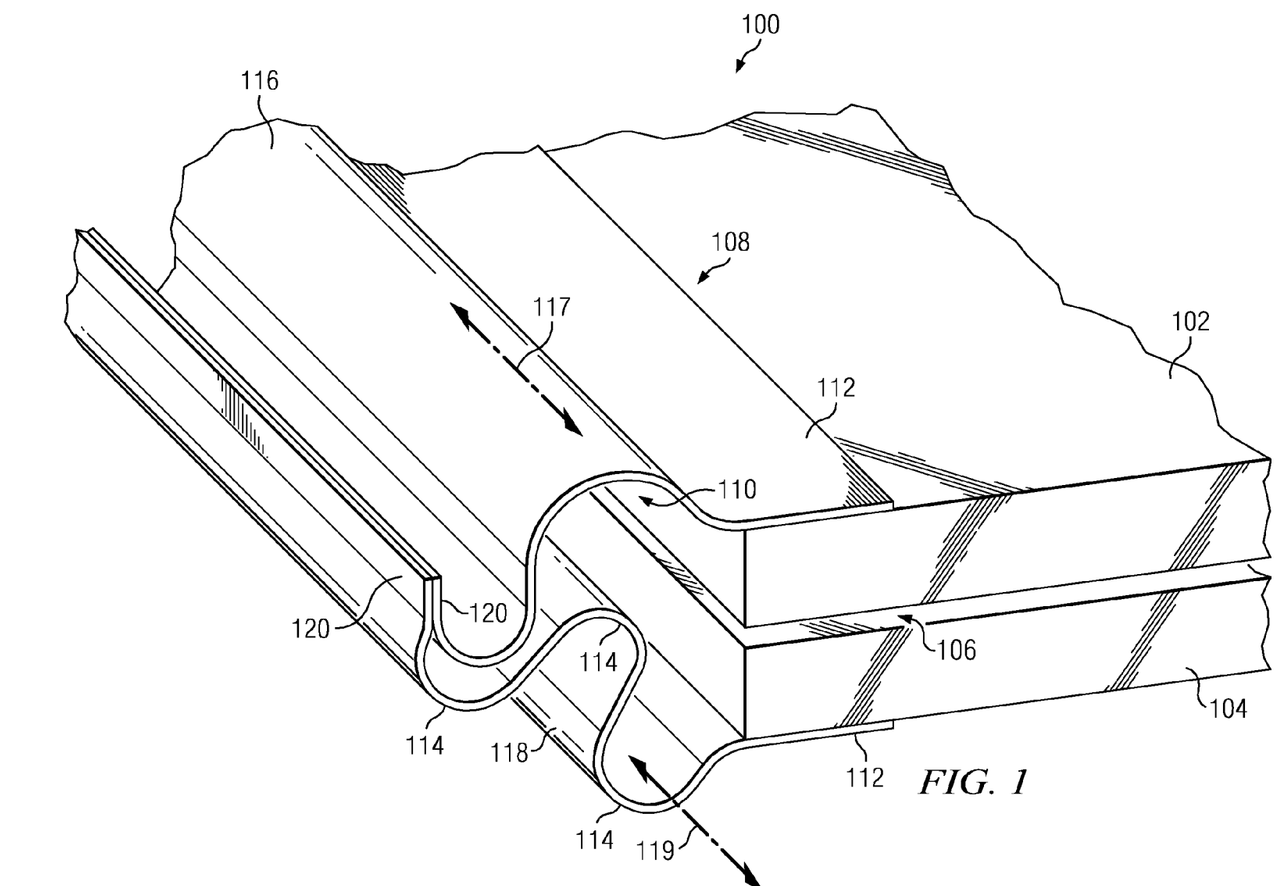
FIG. 1 is a partial cross-sectional perspective view of a vacuum insulating glazing unit (VIGU) including a flexible edge seal (FES) in accordance with one embodiment of the invention.

Referring now to FIG. 1, there is illustrated a vacuum insulating glazing unit (VIGU) in accordance with one embodiment. VIGU 100 includes a pair of glass panes 102 and 104 separated by insulating gap 106. A flexible edge seal (herein also called a "FES") 108 is hermetically attached between the panes 102, 104 around their entire periphery, thereby defining an interior space 110 in communication with the gap 106. The gap 106 and space 110 may be evacuated (or partially evacuated), to provide a thermal barrier between panes 102 and 104.

Figure 2:
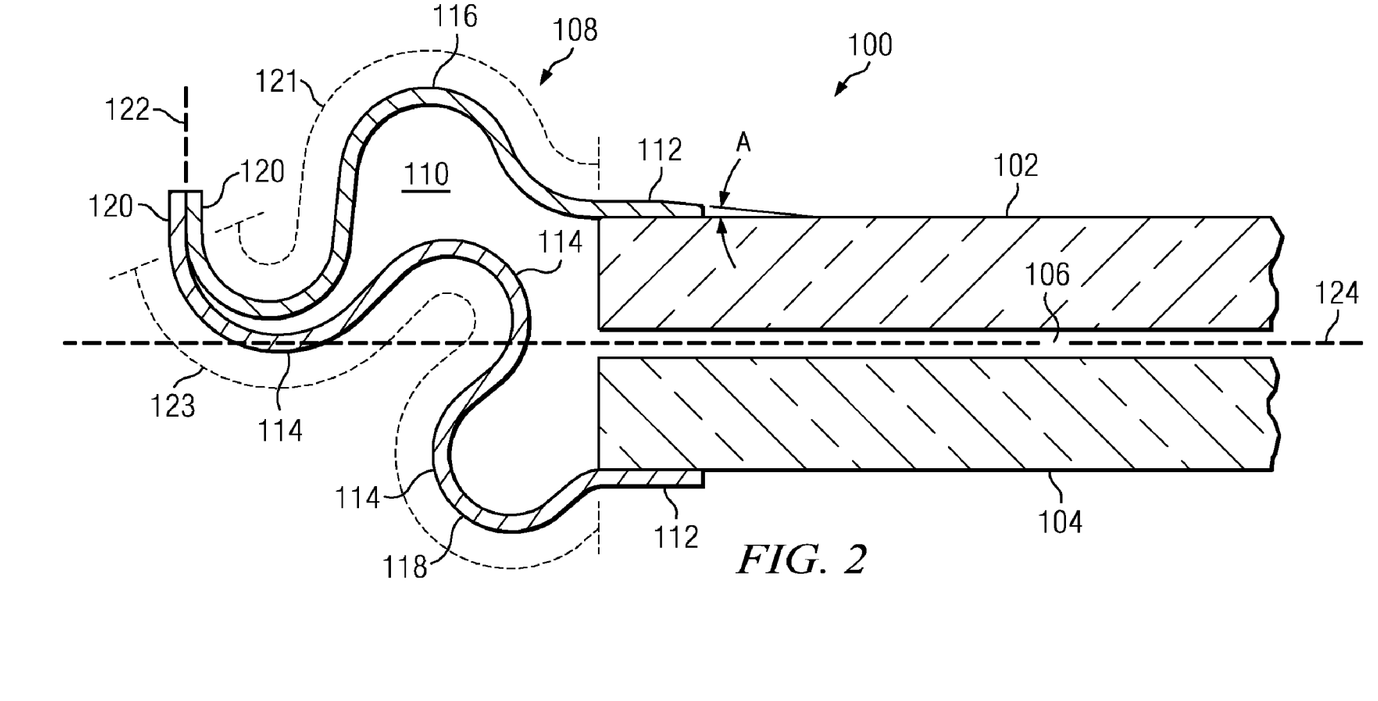
FIG. 2 is a edge view of the VIGU and FES of FIG. 1.

Referring still to FIG. 1, and also now to FIG. 2, the flexible edge seal 108 includes an elongate first edge seal portion 116 defining a first longitudinal axis 117 and an elongate second edge seal portion 118 defining a second longitudinal axis 119, the longitudinal axes 117 and 119 being oriented generally parallel to the adjacent edge of the glass panes 102 and 104, respectively. The first edge seal portion 116 has a substantially constant cross-section when viewed along the first longitudinal axis 117. The cross-section of the first edge seal portion 116 includes a bonding flange 112 at one end, a weld surface 120 at the other end and a first center portion 121 (denoted using broken line in FIG. 2) therebetween. The second edge seal portion has a substantially constant cross-section when viewed along the second longitudinal axis 119. The second cross-section includes a bonding flange 112 at one end, a weld surface 120 at the other end and a second center portion 123 (denoted using broken line in FIG. 2) therebetween.

Each bonding flange 112 includes a substantially flat portion adapted for hermetic bonding to the surface of a different one of the pair of glass panes 102 and 104. The weld surfaces 120 are hermetically joined to one another along bonding plane 122 to form a hermetic seal therebetween. As further described below, the hermetic joining of the weld surfaces 120 may be accomplished by welding, but is not limited to joints/seals created by welding, provided the resulting joint/seal is hermetic.

At least one of the first center portion 121 and the second center portion 123 has a convoluted cross-section that is asymmetrical to the other center portion (i.e., with respect to a plane 124 defined by the center of the insulating gap) when viewed parallel to one of the longitudinal axes 117, 119). It will be understood that the substantially constant cross-sections of the first and second edge seal portions 116, 118 will extend adjacent to the straight edges of the panes 102, 104, but may or may not extend into the region adjacent to the corners of the panes.

Referring now still to FIG. 2, the FES 108 has an asymmetric convolute form (i.e., when viewed in cross-section along a line parallel to one of the longitudinal axes 117, 119). When hermetically bonded at the bonding flanges 112 to the respective adjacent panes 102 and 104, the FES 108 forms a hermetic seal to maintain the vacuum between the glass panes 102, 104, and at the same time provides the ability to deflect in a manner that allows transient stresses to be relieved, thereby eliminating the issue of the VIGU 100 bowing under differential outer and inner temperatures.

While potentially many embodiments of the FES may in fact allow deflection and serve to relieve the transient stresses under exposure to cold and warm environments, the physical size and shape of the FES itself will determine its feasibility for implementation in a VIGU component, which subsequently is integrated into window sash frame assembly or into a curtain-wall or storefront assembly. The asymmetric arrangement of FES 108 disclosed in FIGS. 1 and 2 minimizes the volume it occupies at the edge of the VIGU 100.

Referring still to FIGS. 1 and 2, the edge seal portions 116 and 118 of FES 108, when viewed in cross-section, may include multiple convolutes (i.e., curves) 114 extending away from the panes, creating a bellows-shaped profile. It will be understood that the term "convolute," as used herein, refers to a curved section that loops or curves continuously in a single turning direction. A convolute may be bounded by an endpoint, by a straight (i.e., uncurved) section, or by another convolute curving in the opposite direction. By means of example, multiple convolutes linked together in series may form a corrugated section. Preferably, the convolutes 114 on one side of the FES 108 are nested within the convolutes on the other side as shown in FIGS. 1 and 2, thereby minimizing the protrusion of the bellows profile beyond the viewing planes of the glass panes 102 and 104. This allows the end-use product developer to integrate the VIGU 100 into the sash frame assembly (not shown) of the window without requiring substantially thicker sash frame profile dimensions. The need to accommodate larger deflections, which result from the use of larger pieces of glass panes 102, 104 may be satisfied by increasing the out-of-plane height of the convolutes 114, by adding more convolutes, or by a combination of both, thus extending the overall length and width of the VIGU 100.

In some embodiments, a portion of the nested convolute 114 of the asymmetric FES 108 attached to the inner pane 102 may touch a portion of the nested convolute attached to the outer pane 104 or vice versa, when vacuum is applied. This facilitates resisting collapse under external atmospheric pressure when relatively thin materials are used the FES 108, while at the same time allowing for flexing of the convolutes 114 to allow for movements of inner and outer panes 102, 104 caused by temperature differentials and other forces.

In other embodiments, a portion of the nested convolute 114 of the asymmetric FES 108 attached to either the inner or outer pane 102, 104 may touch the outer edge of the glass (i.e., normal to the glass-to-metal bonding plane) when vacuum is applied. This facilitates resisting collapse under atmospheric pressure with material of relatively small thickness, while at the same time allowing for flexing of the convolutes 114 to allow for movements of inner and outer panes 102, 104 caused by temperature differentials.

In preferred embodiments, the number of nested convolutes 114 on FES 108 may range from one to six, depending on the size and configuration of the glass panes 102, 104.

The FES 108 of VIGU 100 may be formed from stainless steel, carbon steel, titanium, aluminum, or other metals. In preferred embodiments, the FES 108 is formed from stainless steel having a thickness within the range from about 0.004 inch to about 0.030 inch. In other preferred embodiments, the FES 108 is formed from a superferritic stainless steel, e.g., AL 29-4C® a superferritic stainless steel available from ATI Allegheny Ludlum Corporation of Pittsburgh, Pa. In yet other preferred embodiments, the FES 108 is formed from a ferritic stainless steel, e.g., Grade 430, a ferritic stainless steel available from a variety of commercial sources.

In some embodiments, the flanges 112 of the FES 108 may be tapered in thickness in the region where they are bonded to the panes 102, 104, thereby defining an angle A (FIG. 2) between the upper and lower surfaces of the flange ranging from about 2 degrees to about 10 degrees. The tapering of the flanges 112 is believed to aid in achieving minimal stress in the glass-to-metal joint. The thinnest portion of the flange material is oriented toward the middle of the glass pane, increasing in thickness further towards the outside edge of the assembly.

In some embodiments, the described (preferably asymmetric) FES 108 may be formed from a first portion 116 and a second portion 118 that are hermetically joined at the outermost surfaces 120 (i.e., the surfaces farthest from the flanges 112). Preferably, welding will be used to join the portions 116, 118, however, other sealing technologies may be used, provided the result is a hermetically-tight, physically strong joint. In some embodiments, the respective portions 116, 118 may be configured to provide for weld joint alignment, placement of the weld and subsequent handling protection for the finished component. For example, in the embodiment shown in FIGS. 1 and 2, the bonding plane 122 defined between the weld surfaces 120 is oriented substantially perpendicular to the plane 124 between the panes 102, 104. In some embodiments, the portions 116 and 118 may be configured to provide interference angles at the welded joint surfaces 120 to facilitate the alignment of the edges to be subsequently welded.

In other embodiments, the bonding plane 122 between the weld surfaces 120 is oriented so that it is easily hermetically sealed, using one of the following methods: laser welding; electron beam welding; seam welding; solder joining; resistance welding; and TIG welding.

The portion of the (preferably asymmetric) FES 108 that is to be welded may be located in a plane (e.g., plane 122) that is normal to the plane 124 of the glass-to-metal joint and as such is configured in such a manner that risk of handling damage to the joint and to the FES itself is minimized.

Figure 3:
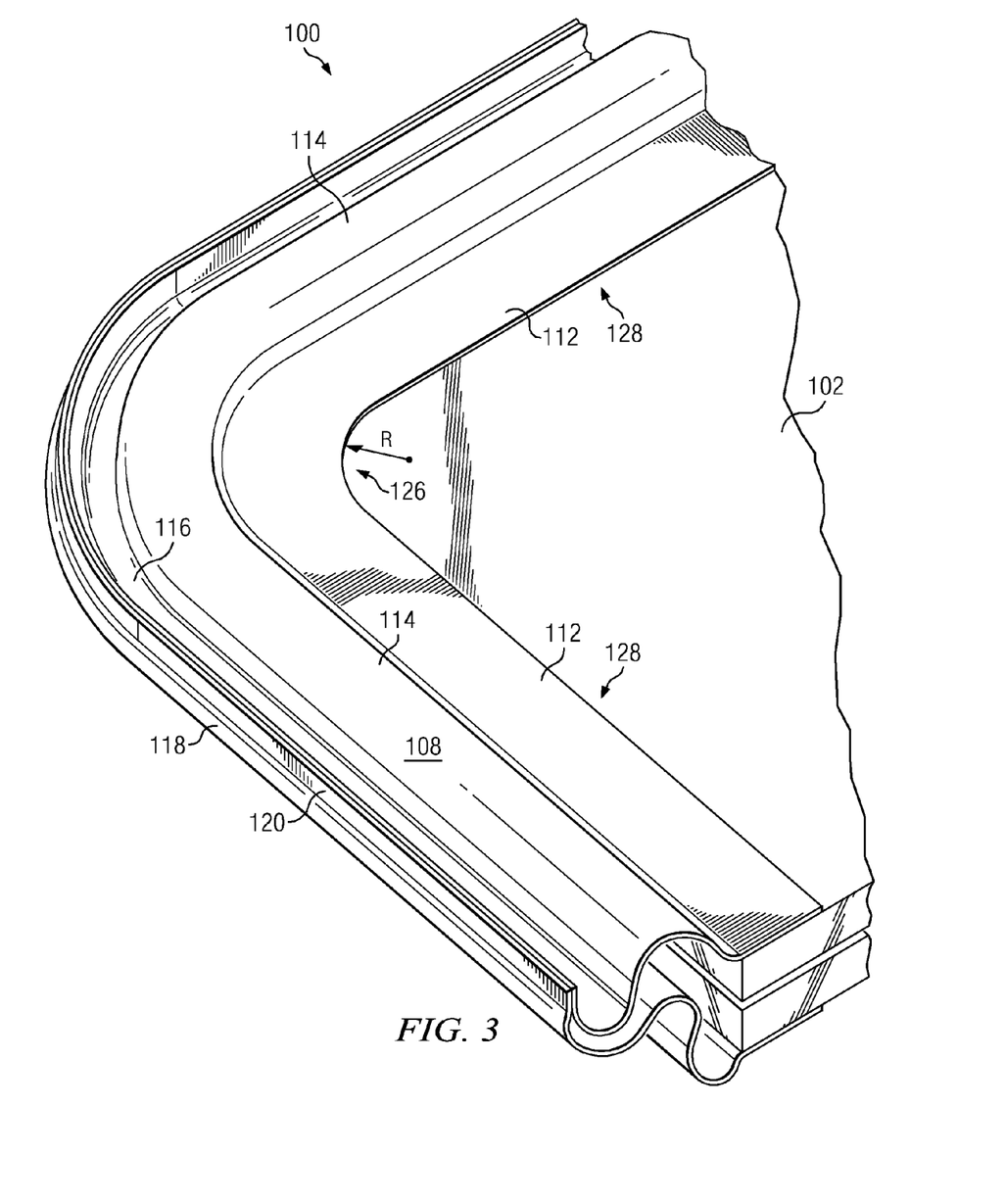
FIG. 3 is a perspective view of a portion of the VIGU of FIG. 1 showing the structure of the FES at the corner.

Referring now to FIG. 3, there is illustrated another portion of the VIGU 100 showing an asymmetric FES 108 having rounded corners 126 to minimize the stress. In some embodiments, the inside radius R of corners 126 may range from about 0.15 inch to about 0.75 inch. In preferred embodiments, the inside radius R of corners 126 may range from about 0.15 inch to about 0.50 inch The asymmetric FES 108 may be formed by one or more of the following methods to ensure reliable glass-to-metal bonding, reliable welding and vacuum leak-free performance. First, the FES 108 may be cut from a single sheet to required width, and then progressively die formed to provide uniform convolutes 114, corners 126 and straight lengths 128 to develop a finished unit corresponding to the ordered size. Alternatively, straight lengths of strip may be slit to the required width, cut to appropriate length, welded at the corners and progressively die-formed to provide uniform convolutes 114, corners 126 and straight lengths 128 to develop a finished FES unit 108 corresponding to the ordered size. Yet further, straight lengths of strip may be slit to the required width, roll-formed to provide uniform convolutes 114, cut to required lengths and then welded to discrete, formed corner pieces, to develop a finished FES unit 108 corresponding to the ordered size.

Welding methods believed suitable for forming the FES 108 include: laser welding, electron beam welding and TIG welding. Corner-forming methods believed suitable for forming the FES 108 include hot isostatic press, hot and cold drawing and forming, forging and spin forming.

It will be appreciated by those skilled in the art having the benefit of this disclosure that this asymmetrical flexible edge seal for vacuum insulating glass provides an airtight (e.g., hermetic) flexible edge seal between the spaced-apart panes of an insulating glazing device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A flexible edge seal for a vacuum insulating glazing unit including a pair of glass panes separated by an insulating gap, the flexible edge seal comprising:
an elongate first edge seal portion defining a first longitudinal axis, the first edge seal portion having a substantially constant first cross-section when viewed along the first longitudinal axis, the first cross-section including a bonding flange at one end, a weld surface at the other end and a first center portion therebetween;
an elongate second edge seal portion defining a second longitudinal axis substantially parallel to the first longitudinal axis, the second edge seal portion having a substantially constant second cross-section when viewed along the second longitudinal axis, the second cross-section including a bonding flange at one end, a weld surface at the other end and a second center portion therebetween;
wherein each bonding flange includes a substantially flat portion adapted for hermetic bonding to a surface of a different one of the pair of glass panes and wherein the respective flat portions of the bonding flanges are disposed substantially parallel to one another and parallel to a plane between the pair of glass panes;
wherein the weld surfaces are disposed substantially parallel to one another and parallel to a bonding plane that is oriented substantially perpendicular to the plane between the pair of glass panes, and the weld surfaces are hermetically joined to one another forming a hermetic seal therebetween; and
wherein at least one of the first center portion or the second center portion has a convolute cross-section and is asymmetrical, with respect to a plane defined by the center of the insulating gap, to the other center portion.

2. A flexible edge seal in accordance with claim 1, wherein at least one of the first center portion or the second center portion includes multiple convolutes.

3. A flexible edge seal in accordance with claim 1, wherein both the first center portion and the second center portion include at least one convolute.

4. A flexible edge seal in accordance with claim 3, wherein the first center portion includes a different number of convolutes than the second center portion.

5. A flexible edge seal in accordance with claim 3, wherein both the first center portion and the second center portion include multiple convolutes.

6. A flexible edge seal in accordance with claim 5, wherein the number of convolutes on each of the first and second center portions is within the range from two convolutes to six convolutes.

7. A flexible edge seal in accordance with claim 5, wherein the first center portion includes a different number of convolutes than the second center portion.

8. A flexible edge seal in accordance with claim 3, wherein at least one of the convolutes on one of the first and second center portions crosses the plane defined by the center of the insulating gap and at least partially nests within a convolute on the other of the center portions.

9. A flexible edge seal in accordance with claim 1, wherein the upper and lower surfaces of at least one of the bonding flanges define a taper angle with respect to one another such that the bonding flange tapers in thickness in the region adapted for bonding to the pane.

10. A flexible edge seal in accordance with claim 9, wherein the taper angle is within the range from about 2 degrees to about 10 degrees.

11. A vacuum insulating glazing unit comprising:
a pair of glass panes separated by an insulating gap and a flexible edge seal, the flexible edge seal including
an elongate first edge seal portion defining a first longitudinal axis, the first edge seal portion having a substantially constant first cross-section when viewed along the first longitudinal axis, the first cross-section including a bonding flange at one end, a weld surface at the other end and a first center portion therebetween;

an elongate second edge seal portion defining a second longitudinal axis substantially parallel to the first longitudinal axis, the second edge seal portion having a substantially constant second cross-section when viewed along the second longitudinal axis, the second cross-section including a bonding flange at one end, a weld surface at the other end and a second center portion therebetween;

each bonding flange including a substantially flat portion hermetically bonded to a surface of a different one of the pair of glass panes, the respective flat portions of the bonding flanges being disposed substantially parallel to one another and parallel to a plane between the pair of glass panes;

the weld surfaces being disposed substantially parallel to one another and parallel to a bonding plane that is oriented substantially perpendicular to the plane between the pair of glass panes, and the weld surfaces being hermetically joined to one another forming a hermetic seal therebetween; and at least one of the first center portion or the second center portion having a convolute cross-section and being asymmetrical, with respect to a plane defined by the center of the insulating gap, to the other center portion.

12. A vacuum insulating glazing unit in accordance with claim 11, wherein at least one of the first center portion or the second center portion includes multiple convolutes.

13. A vacuum insulating glazing unit in accordance with claim 11, wherein both the first center portion and the second center portion include at least one convolute.

14. A vacuum insulating glazing unit in accordance with claim 13, wherein the first center portion includes a different number of convolutes than the second center portion.

15. A vacuum insulating glazing unit in accordance with claim 13, wherein the number of convolutes on each of the first and second center portions is within the range from two convolutes to six convolutes.

16. A vacuum insulating glazing unit in accordance with claim 13, wherein at least one of the convolutes on one of the first and second center portions crosses the plane defined by the center of the insulating gap and at least partially nests within a convolute on the other of the center portions.

17. A vacuum insulating glazing unit in accordance with claim 11, wherein the upper and lower surfaces of at least one of the bonding flanges define a taper angle with respect to one another such that the bonding flange tapers in thickness in the region adapted for bonding to the pane.

* * * * *

UNITED STATES PATENT AND TRADEMARK OFFICE
CERTIFICATE OF CORRECTION

| | | |
|---|---|---|
| PATENT NO. | : 8,283,023 B2 | Page 1 of 1 |
| APPLICATION NO. | : 12/537816 | |
| DATED | : October 9, 2012 | |
| INVENTOR(S) | : Lawrence Mott, Kenneth Bettger and Elliot Brown | |

It is certified that error appears in the above-identified patent and that said Letters Patent is hereby corrected as shown below:

Col. 1, line 13, please insert the following paragraph: --This Invention was made with government support under Contract No. DE-FC26-06NT42765 awarded by the Department of Energy. The Government has certain rights in this invention.--

Signed and Sealed this

Twenty-seventh Day of November, 2012

David J. Kappos
*Director of the United States Patent and Trademark Office*